United States Patent [19]

Kiser

[11] Patent Number: 5,422,071
[45] Date of Patent: Jun. 6, 1995

[54] HEAT RESISTANT IRON/STEEL WELD MATERIAL

[75] Inventor: Samuel D. Kiser, Lenoir, N.C.

[73] Assignee: Inco Alloys International, Inc., Huntington, W. Va.

[21] Appl. No.: 225,017

[22] Filed: Apr. 8, 1994

[51] Int. Cl.$^6$ .................... C22C 19/03; C22C 38/04; B32B 15/18

[52] U.S. Cl. .................... 420/73; 420/581; 428/679; 428/682

[58] Field of Search .................... 420/73, 581; 428/679, 428/682

[56] References Cited

U.S. PATENT DOCUMENTS

| | | | |
|---|---|---|---|
| 2,499,827 | 3/1950 | Kihlgren | 219/8 |
| 3,184,577 | 5/1965 | Witherell | 219/137 |
| 3,466,422 | 9/1969 | Witherell | 219/146 |
| 3,573,897 | 4/1971 | Wache | 75/123 |
| 3,647,426 | 3/1972 | Wache | 75/129 |
| 3,778,588 | 12/1973 | Bishel | 219/146 |
| 3,977,867 | 8/1976 | Cochran et al. | 75/126 A |
| 4,534,793 | 8/1985 | Olson et al. | 420/73 |
| 4,891,076 | 1/1990 | Kovacs | 148/3 |
| 5,304,346 | 4/1994 | O'Donnell et al. | 420/580 |

FOREIGN PATENT DOCUMENTS 46-25971   7/1971   Japan .................... 420/73

OTHER PUBLICATIONS

Welding Products Advertising Brochure, Publication No. IAI-27-1, p. 20, 1989.

Kiss et al, "Influence of Vanadium and Niobium on the Microstructure of Nodular Cast Iron Welds," Ruhr-Univesitat Bochum, Schweissen und Schneiden, 43, (6), E125-E127, Jun. 1991.

*Primary Examiner*—Deborah Yee
*Attorney, Agent, or Firm*—Blake T. Biederman; Edward A. Steen

[57] ABSTRACT

The invention provides a welding material useful for welding cast iron, the welding material forms a weld deposit containing, as measured in the undiluted condition, by weight percent, about 30–50% nickel, about 8–20% manganese, about 0 to 0.6% carbon, about 1 to 8% of at least one carbide selected from the group consisting of chromium carbide, niobium carbide, tantalum carbide, titanium carbide or vanadium carbide and balance iron and incidental impurities.

19 Claims, No Drawings

HEAT RESISTANT IRON/STEEL WELD MATERIAL

BACKGROUND OF INVENTION

Welding products that promote the formation of graphite in the weld deposit are currently used for all types of cast irons. Formation of graphite in the weld deposit provides the advantages of 1) causing a volume expansion that offsets shrinkage stresses developed by solidification, 2) forming chip-breakers to facilitate machining of normally "gummy" nickel-containing alloy deposits and 3) forming graphite at the expense of carbides to reduce the tendency for cracking in the deposit caused by the formation of very hard, brittle carbides.

Generally, increasing the size and volume fraction of carbides in a cast iron weld deposit increases the cracking tendency of the weld deposit. Virtually all cast iron welding products on the market today employ graphite-forming technology to provide the benefits of graphite phase and minimize cracking. In addition, aluminum and silicon are often added to weld metals to enhance oxidation resistance. Aluminum and silicon further serve as graphite phase stabilizers in iron castings.

It has been discovered that when ductile iron is welded to aluminized steel with conventional graphite forming nickel-iron products, the weld has poor high temperature properties. At high temperatures graphite migrates to grain boundaries and weld centerlines to form areas of weakness. At temperatures of approximately 500° to 800° C., graphite-containing welds to cast iron products quickly fail.

It is an object of this invention to provide a weld deposit that will not fail at elevated temperatures.

It is a further object of the invention to provide a flux-cored welding wire or flux coated electrodes capable of welding cast iron for high temperature applications.

It is a further object of the invention to provide a filler metal capable of welding cast iron for high temperature applications.

It is a further object of the invention to provide a welding material capable of welding aluminized steel to cast iron for high temperature applications.

SUMMARY OF THE INVENTION

The invention provides a welding material useful for welding cast iron, the welding material forms a weld deposit containing, as measured in the undiluted condition, by weight percent, about 30–50% nickel, about 8–20% manganese, about 0 to 0.6% carbon, about 1 to 8% of at least one carbide selected from the group consisting of chromium carbide, niobium carbide, tantalum carbide, titanium carbide or vanadium carbide and balance iron and incidental impurities.

DESCRIPTION OF PREFERRED EMBODIMENT

It has been discovered that carbide forming elements may be added to a nickel-iron-manganese alloy to form stable carbide phases in a cast iron weld deposit. The carbides formed are stable and do not migrate at temperatures between 500° and 800° C. The carbide-former is selected from the group consisting of chromium, niobium, tantalum, titanium and vanadium.

In particular, a weld deposit having a matrix of about 30–50% nickel balance iron (along with incidental impurities) is used to produce an austenitic matrix. (All compositions contained in this specification are expressed in weight percent, and all weld deposit composition ranges refer to measured in the undiluted condition, unless specifically stated otherwise.) Most advantageously, the weld deposit contains about 35–45% nickel. In addition, the weld deposit contains about 8–20% manganese to lower the melting temperature of the weld metal closer to the melting temperature of cast iron. Most advantageously, the weld deposit contains 10–15% manganese.

The weld material contains 0–0.6% carbon for forming carbides. It is possible to have only dilution from the cast iron supply carbon for carbide formation. However, it is advantageous to add at least about 0.05–0.4% carbon to the weld deposit to promote carbide formation and further lower melting point of the weld metal.

The weld deposit contains at least 1–8% carbide formed with at least one carbide selected from the group consisting of chromium carbide, niobium carbide, tantalum carbide, titanium carbide and vanadium carbide. Most advantageously, the carbide is chromium and/or niobium carbide. During welding, elemental carbide-formers combine with carbon to form carbides stable at high temperatures.

The welding material is advantageously constructed of a nickel/iron/manganese sheath containing a carbide forming flux or of a nickel/iron sheath with manganese and a carbide forming flux. Advantageously, the flux contains chromium powder an&or niobium powder. Alternately, the weld deposit may be formed from a coated welding electrode. It is also advantageous to add carbide-former through the flux when using a flux coated welding electrode.

The weld deposit may also be formed directly from a filler metal wire. Advantageously, the filler metal contains about 35–45% nickel, about 10–15% manganese, and about 1 to 8% of at least one element selected from the group consisting of chromium, niobium, tantalum, titanium and vanadium. Most advantageously the element is chromium and/or niobium.

A weld deposit containing 28–32% Ni, 8–9% Mn, 0.6–0.7% C, 1.2% Cr and balance iron, as measured in a ,diluted condition, was formed. The weld deposit had a structure or skeletal cementite or carbide in an austenite matrix. After several cycles at temperatures between 649° and 760° C., the morphology was relatively small dispersed carbides in an austenite matrix. The carbides did not form the areas of weakness characteristic of graphite-containing weld deposits.

The welding materials of the invention contain a source of carbide-formers that overwhelm the graphitizing elements encountered from the materials being welded. The welding material is advantageously used to form a weld deposit between east iron and aluminized steel, cast iron or stainless steel. There is a sacrifice in machinability that is imposed by the formation of carbides instead of graphite. However, it is unlikely the high temperature applications for the weld materials of the invention will require good machinability. Furthermore, with various grades of ductile iron, graphite rejection to cause a volume increase to protect the cast iron from cracking is not required, since ductile iron has excellent weldability and crack resistance.

In particular, a weld deposit composition of about 40% nickel, 11–13% Mn, 0.2–4% carbon, 1–8% chromium (or other carbide former), balance iron in the undiluted condition is most advantageous. The weld deposit composition allows a welder to weld aluminized steel to ductile (or gray) iron and survive exposure to 500° to 800° C. without the troublesome area of weakness that lead to failure.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A weld deposit produced from a welding material useful for welding east irons, said weld deposit containing, by weight percent, as measured in an undiluted condition, about 30–50% nickel, about 8–20% manganese, about 0–0.6% carbon, about 1 to 8% of at least one carbide-former selected from the group consisting of chromium, niobium, tantalum, titanium, and vanadium and balance iron and incidental impurities.

2. The welding deposit of claim 1 wherein said weld deposit contains about 1 to 8% chromium.

3. The welding deposit of claim 1 wherein said welding deposit contains about 35–45% nickel, about 10–15% manganese and about 0.05 to 0.4% carbon.

4. The welding deposit of claim 1 wherein said welding deposit is formed between a cast iron and an alloy selected from the group consisting of aluminized steel, cast iron and stainless steel.

5. The welding deposit of claim 1 wherein said alloy is aluminized steel.

6. The welding deposit of claim 1 wherein said welding deposit is formed from a flux-cored electrode having a configuration selected from the group consisting of a nickel/iron/manganese sheath with a carbide forming flux and a nickel/iron sheath with a carbide forming flux.

7. The welding deposit of claim 6 Wherein said carbide forming flux is selected from the group consisting of chromium powder and niobium powder.

8. The welding deposit of claim 1 wherein said welding deposit is formed from a filler metal containing about 35–45% nickel, about 10–15% manganese.

9. The welding deposit of claim 8 wherein said filler metal contains at least one element selected from the group consisting of chromium and niobium.

10. The welding deposit of claim 1 wherein said welding deposit contains at least about 0.25% carbon.

11. A welding deposit produced from a welding material useful for welding cast irons, said weld deposit containing, as measured in an undiluted condition, by weight percent about 35–45% nickel, about 10–15% manganese, about 0.05–0.45% carbon, about 1 to 8% of at least one carbide-former selected from the group consisting of chromium, niobium, tantalum, titanium, and vanadium and balance iron and incidental impurities.

12. The welding material of claim 11 wherein said weld deposit contains about 1 to 8% chromium.

13. The welding material of claim 11 wherein said welding deposit is formed between a cast iron and an alloy selected from the group consisting of aluminized steel, cast iron and stainless steel.

14. The welding material of claim 13 wherein said alloy is aluminized steel.

15. The welding material of claim 11 wherein said welding deposit is formed from a flux-cored electrode having a configuration selected from the group consisting of a nickel/iron/manganese sheath with a carbide forming flux and a nickel/iron sheath with a carbide forming flux.

16. The welding material of claim 15 wherein said carbide forming flux is selected from the group consisting of chromium powder and niobium powder.

17. The welding material of claim 11 wherein said welding deposit is formed from filler metal.

18. The welding material of claim 17 wherein said filler metal contains at least one element selected from the group consisting of chromium and niobium.

19. The welding material of claim 11 wherein said welding deposit contains at least about 0.2% carbon.

* * * * *